United States Patent
Chung et al.

(10) Patent No.: US 8,441,682 B2
(45) Date of Patent: May 14, 2013

(54) PRINT CONTROLLING TERMINAL AND COLOR CORRECTION METHOD GENERATING PRINT DATA USING MONITOR PROFILE CHANGED BASED ON COMPARISON OF PRINTED TEST IMAGE TO EXPECTED PRINT IMAGE DISPLAYED ON MONITOR

(75) Inventors: Woo-jun Chung, Suwon-si (KR); Kyeong-man Kim, Yongin-si (KR); Min-ki Cho, Yongin-si (KR); Hyun-soo Oh, Suwon-si (KR); Heui-keun Cho, Seongnam-si (KR); Yeong-ho Ha, Daegu (KR); In-su Jang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 12/953,878

(22) Filed: Nov. 24, 2010

(65) Prior Publication Data

US 2011/0299100 A1 Dec. 8, 2011

(30) Foreign Application Priority Data

Jun. 4, 2010 (KR) .................. 10-2010-0052833

(51) Int. Cl.
*H04N 1/56* (2006.01)
*H04N 1/60* (2006.01)

(52) U.S. Cl.
USPC ............ 358/1.9; 358/504; 358/518; 358/527

(58) Field of Classification Search .................. 358/1.9, 358/504, 518–523, 527
See application file for complete search history.

(56) References Cited

U.S. PATENT DOCUMENTS

| | | | | |
|---|---|---|---|---|
| 4,037,249 A | * | 7/1977 | Pugsley | 358/504 |
| 4,639,770 A | * | 1/1987 | Jung et al. | 358/527 |
| 5,081,529 A | * | 1/1992 | Collette | 358/504 |
| 5,563,725 A | * | 10/1996 | Kumada et al. | 358/518 |
| 5,574,664 A | * | 11/1996 | Feasey | 358/518 |
| 6,560,358 B1 | * | 5/2003 | Tsukada | 358/518 |
| 2006/0132867 A1 | * | 6/2006 | Sugiyama et al. | 358/504 |
| 2007/0291287 A1 | * | 12/2007 | Snyder et al. | 358/518 |

* cited by examiner

Primary Examiner — Scott A Rogers
(74) Attorney, Agent, or Firm — Stanzione & Kim, LLP

(57) ABSTRACT

A color correction method includes displaying an expected print image of a test image of the image forming apparatus on a monitor, outputting the test image to the image forming apparatus, performing color matching between the output test image and an expected print image on the monitor, changing an ICC profile of the monitor according to the performed color matching, and generating a print data using the changed ICC profile. Also a print controlling terminal which performs the color correction method.

25 Claims, 8 Drawing Sheets

PRINT CONTROLLING TERMINAL AND COLOR CORRECTION METHOD GENERATING PRINT DATA USING MONITOR PROFILE CHANGED BASED ON COMPARISON OF PRINTED TEST IMAGE TO EXPECTED PRINT IMAGE DISPLAYED ON MONITOR

CROSS-REFERENCE TO RELATED APPLICATIONS

This application claims the benefit under 35 U.S.C. §119 (a) to Korean Patent Application No. 2010-52833, filed on Jun. 4, 2010, in the Korean Intellectual Property Office, the disclosure of which is incorporated herein by reference in its entirety.

BACKGROUND

1. Field of the Invention

The present general inventive concept generally relates to a print controlling terminal and a color correction method, and more particularly, to a print controlling terminal which is capable of matching colors of an output image of a monitor with colors of an output image of an image forming apparatus by changing an International Color Consortium (ICC) profile of the monitor, and a color correction method applying the same.

2. Description of the Related Art

Generally, an image forming apparatus refers to an apparatus that prints print data generated from a print controlling terminal such as a computer on a recording paper, and examples of such an image forming apparatus include a copy machine, a printer, a facsimile or a Multi-Function Peripheral (MFP) which combines the functions of all apparatuses into one.

Since the color gamut of an image forming apparatus is smaller than the color gamut of a monitor, a color-matching process is required in order for the image forming apparatus to print RGB images on the print controlling terminal. Accordingly, each manufacturer provides an ICC profile suitable for each product so that color-matching can be performed using the provided ICC profile.

However, while color reproduction information in an ICC profile provided by a manufacturer does not change, output properties of a monitor are changing over time due to its element properties. In addition, as color temperature, brightness, and contrast can be adjusted by a user, output colors may be different from those output on the monitor. Therefore, there is a limit to the degree of accuracy in reproducing colors by a printer only using an ICC profile provided by a manufacturer.

SUMMARY

The present general inventive concept provides a print controlling terminal which is capable of matching colors of an output image of a monitor with colors of an output image of an image forming apparatus by changing an International Color Consortium (ICC) profile of the monitor, and a color correction method applying the same.

Additional aspects and utilities of the present general inventive concept will be set forth in part in the description which follows and, in part, will be obvious from the description, or may be learned by practice of the present general inventive concept.

A color correction method, according to an exemplary embodiment, includes displaying an expected print image of a test image of the image forming apparatus on a monitor, outputting the test image to the image forming apparatus, performing color matching between the output test image and an expected print image on the monitor, changing an ICC profile of the monitor according to the performed color matching, and generating a print data using the changed ICC profile.

The performing color matching may perform color matching by adjusting at least one of color temperature, brightness, and contrast of the expected print image.

The displaying the expected print image may convert the test image into an image in a CIELAB color space using an ICC profile of the image forming apparatus, inversely convert the test image which is converted into the image in a CIELAB color space into a new image of RGB color space using a pre-stored ICC profile of the monitor, and display the inversely converted test image as an expected output image.

The changing the ICC profile may estimate at least one of color temperature, brightness, and contrast of the monitor and change an ICC profile of the monitor using the estimated properties.

The changing the ICC profile may change an ICC profile of the monitor by correcting a color space value of a pre-stored ICC profile of the monitor using the estimated color temperature.

The changing the ICC profile may correct contrast and brightness of the pre-stored ICC profile using a following equation:

$$Y_i = \left(g_i \times \frac{d_i}{255} + o_i\right)^{r_i} \quad i = R, G, B$$

Herein, 'Y' refers to output brightness, 'g' refers to gain, 'd' refers to input digital value, 'o' refers to offset, and 'r' refers to gamma.

The test image may include a user's favorite color.

The generating the print data may generate a color conversion table using a changed ICC profile of the monitor and an ICC profile of the image forming apparatus and generate print data using the generated color conversion table.

The method may further include storing the generated color conversion table.

A print controlling terminal, according to an exemplary embodiment, includes a video driver unit which displays an expected print image of a test image of the image forming apparatus on a monitor, a communication interface unit which outputs the test image to the image forming apparatus, an input unit which performs color matching between the output test image and an expected print image on the monitor, a changing unit which changes an ICC profile of the monitor according to the performed color matching, and a driver unit which generates a print data using the changed ICC profile.

The input unit may perform color matching by adjusting at least one of color temperature, brightness, and contrast of the expected print image.

The video driver unit may convert the test image into an image in a CIELAB color space using an ICC profile of the image forming apparatus, inversely convert the test image which is converted into the image in a CIELAB color space into a new image of RGB color space using a pre-stored ICC profile of the monitor, and display the inversely converted test image as an expected output image.

The changing unit may estimate at least one of color temperature, brightness, and contrast of the monitor and change an ICC profile of the monitor using the estimated properties.

The changing unit may change an ICC profile of the monitor by correcting a color space value of a pre-stored ICC profile of the monitor using the estimated color temperature.

The changing unit corrects contrast and brightness of the pre-stored ICC profile using a following equation:

$$Y_i = \left(g_i \times \frac{d_i}{255} + o_i\right)^{r_i} \quad i = R, G, B$$

Herein, 'Y' refers to output brightness, 'g' refers to gain, 'd' refers to input digital value, 'o' refers to offset, and 'r' refers to gamma.

The test image may include a user's favorite color.

The driver unit may generate a color conversion table using a changed ICC profile of the monitor and an ICC profile of the image forming apparatus and generate print data using the generated color conversion table.

The print controlling terminal may further include a storage unit which stores the generated color conversion table.

A print controlling terminal, according to another exemplary embodiment, includes a video driver unit which displays a user interface window comprising a first area where an expected print image of a test image of the image forming apparatus is displayed and a second area where at least one of color temperature, brightness and contrast of a monitor is input based on the displayed expected print image and an output test image of the image forming apparatus for color matching, a changing unit which changes an ICC profile of the monitor according to the performed color matching, and a driver unit which generates print data using the changed ICC profile.

The user interface window may further include a third area where a plurality of test images are displayed and a fourth area where a test image output on the image forming apparatus from among the plurality of test images is displayed.

A color correction method, according to another exemplary embodiment, includes comparing an output result of a test image by the image forming apparatus to a displayed expected print image on a monitor, changing an ICC profile of the monitor based on the comparison, and generating a print data using the changed ICC profile.

A print controlling terminal, according to another exemplary embodiment, includes a controller to control displaying an expected print image of a test image of the image forming apparatus on a monitor, to control outputting the test image to the image forming apparatus, and to perform color matching between the output test image and an expected print image on the monitor, a changing unit to change an ICC profile of the monitor according to the performed color matching, and a driver unit to generate a print data using the changed ICC profile.

The terminal may further include an input unit to receive a user input which is provided to the controller to perform the color matching.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
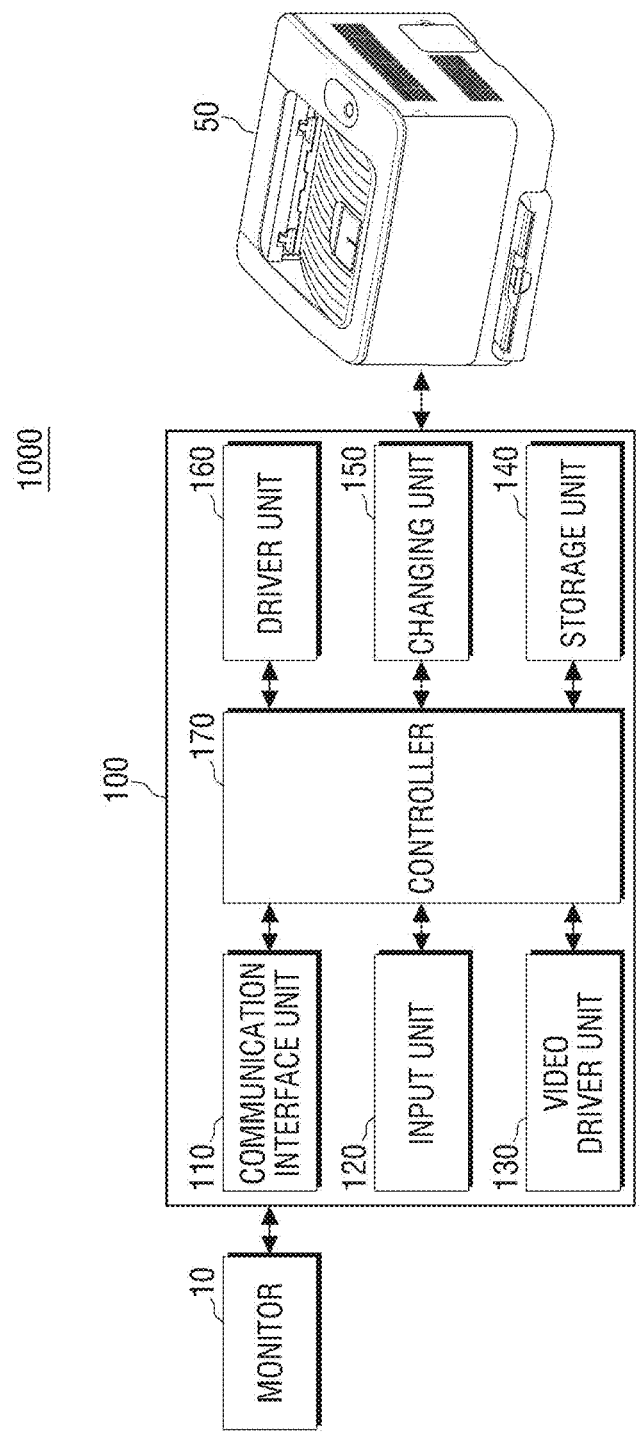
FIG. 1 is a block diagram of a print controlling terminal according to an exemplary embodiment.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram of a print controlling terminal according to an exemplary embodiment.

Referring to FIG. 1, the print controlling terminal 100 comprises a communication interface unit 110, a video driver unit 120, an input unit 130, a storage unit 140, a changing unit 150, a driver unit 160, and a controller 170.

The communication interface unit 110 is connected to an image forming apparatus 50, and transmits print data to the image forming apparatus 50. Specifically, the communication interface unit 110 is provided to connect the print controlling terminal 100 to an external apparatus. The communication interface unit 110 may be connected to the image forming apparatus 50 not only through a Local Area Network (LAN) and Internet network, but also through a Universal Serial Bus (USB) port. In addition, the communication interface unit 110 may transmit print data generated from the driver unit 160 to the image forming apparatus 50. The driver unit 160 will be explained later.

The video driver unit 130 supports interface between the print controlling terminal 100 and the monitor 10, and transmits data regarding an image to the monitor 10 so that the image can be displayed on the monitor 10. Herein, the monitor 10 refers to an apparatus which displays an image provided from the print controlling terminal 100, and may be one of a Cathode Ray Tube (CRT) monitor, a Liquid Crystal Display (LCD), etc.

In addition, the video driver unit 130 may control the monitor 10 to display a soft proofing result on a test image. Herein, the soft proofing is a technology of reproducing output colors of a test image on a monitor when the test image is output by the image forming apparatus 50. Specifically, the soft proofing may be performed by converting the test image into an image in a CIELAB color space using the ICC profile of the image forming apparatus 50, inversely converting the test image into a new image of RGB color space using the ICC profile of the monitor 10, and displaying the inversely converted test image as an expected output image.

The input unit 120 has a plurality of function keys through which a user can set and select various functions supported by the terminal 100, and the input unit 120 may receive various settings or selections from the user. In addition, the input unit 120 may display a user interface window to perform color-matching. The user interface window will be explained later with reference to FIG. 7.

The input unit 120 also performs color-matching. Specifically, the input unit 120 may adjust color temperature, brightness and contrast of an expected print image so that the colors of the expected print image output on the monitor 10 by the user may be the same as the colors of the actual output image. In FIG. 1, the monitor 10 is set to be a separate apparatus from the print controlling terminal 100, but this is only an example. The monitor 10 may be realized as an apparatus included in the print controlling terminal 100, or an apparatus which combine the monitor 10, the video driver 130, and the input unit 120 into a single component that can perform input and output at the same time, such as a touch pad type of device.

The storage unit 140 stores the ICC profile of the monitor 10 and the ICC profile of the image forming apparatus 50. In addition, the storage unit 140 may store an ICC profile and a color conversion table which are changed in the changing unit 150 that will be explained later. The storage unit 140 may be realized as an internal storage medium or an external storage medium of the print controlling terminal 100, such as a removable disk including a USB memory and a web server through a network.

Herein, the ICC profile is standards promulgated by the International Color Consortium to reproduce original colors of an image on an input/output apparatus regardless of color reproduction properties of the input/output apparatus and various image conversion, and the ICC profile is a digital file which defines the relations between a device-dependent color space and a device-independent color space in the form of a mathematical modeling or a look-up table.

The device-dependent color space is a color coordinate which represents a digital control signal value as a specific bit number, such as 8 bit and 10 bit, to quantitatively define colors expressed by an input/output apparatus, and RGB, CMY, and CMYK color spaces are usually used according to a color representation method of an output apparatus and the number of primary colors. Since the device-dependent color space represents colors of an input/output apparatus only as a combination of digital control signal values, the device-dependent color space cannot reflect the original colors presented by the input/output apparatus. In addition, an image having the same color coordinates in the device-dependent color space is represented in different colors when the image is output by an output apparatus which has different color reproduction properties.

The device-dependent color space is a color space coordinate which represents color stimulus values perceived by human eyes quantitatively, and may reflect the same color values regardless of color reproduction properties of an output apparatus. A color coordinate such as sRGB, CIEXYZ, and CIELAB are mainly used.

The ICC profile may be generated through software related to a measuring device such as a color spectrum or a spectroradiometer. However, in the exemplary embodiment, the print data is generated by changing the ICC profile of the monitor 10 based on a comparison between the actual output result and the soft proofing result and using the changed ICC profile.

The changing unit 150 changes an ICC profile of a monitor according to performed color-matching. Specifically, the changing unit 150 may estimate (or calculate) color temperature, brightness, and contrast properties of the monitor 10, and change the ICC profile of the monitor (or generate new ICC profile) using the estimated properties.

The driver unit 160 supports interface between the print controlling terminal 100 and the image forming apparatus 50, and converts data that a user wishes to print into a print data in a language that can be recognized by the image forming apparatus 50.

In addition, the driver unit 160 may generate print data using a changed ICC profile. Specifically, the driver unit 160 may change data that a user wishes to print into a print data by generating a color conversion table using the changed ICC profile of the monitor 10 and the ICC profile of the image forming apparatus 50 and then using the generated color conversion table.

The controller 170 controls each component of the print controlling terminal 100. Specifically, the controller 170 controls to change the ICC profile of the monitor as described above if a user command is input or a predetermined time arrives. If the ICC profile is changed, the controller 170 may control the driver unit 160 to generate print data using the changed ICC profile to perform subsequent print commands.

Figure 2:
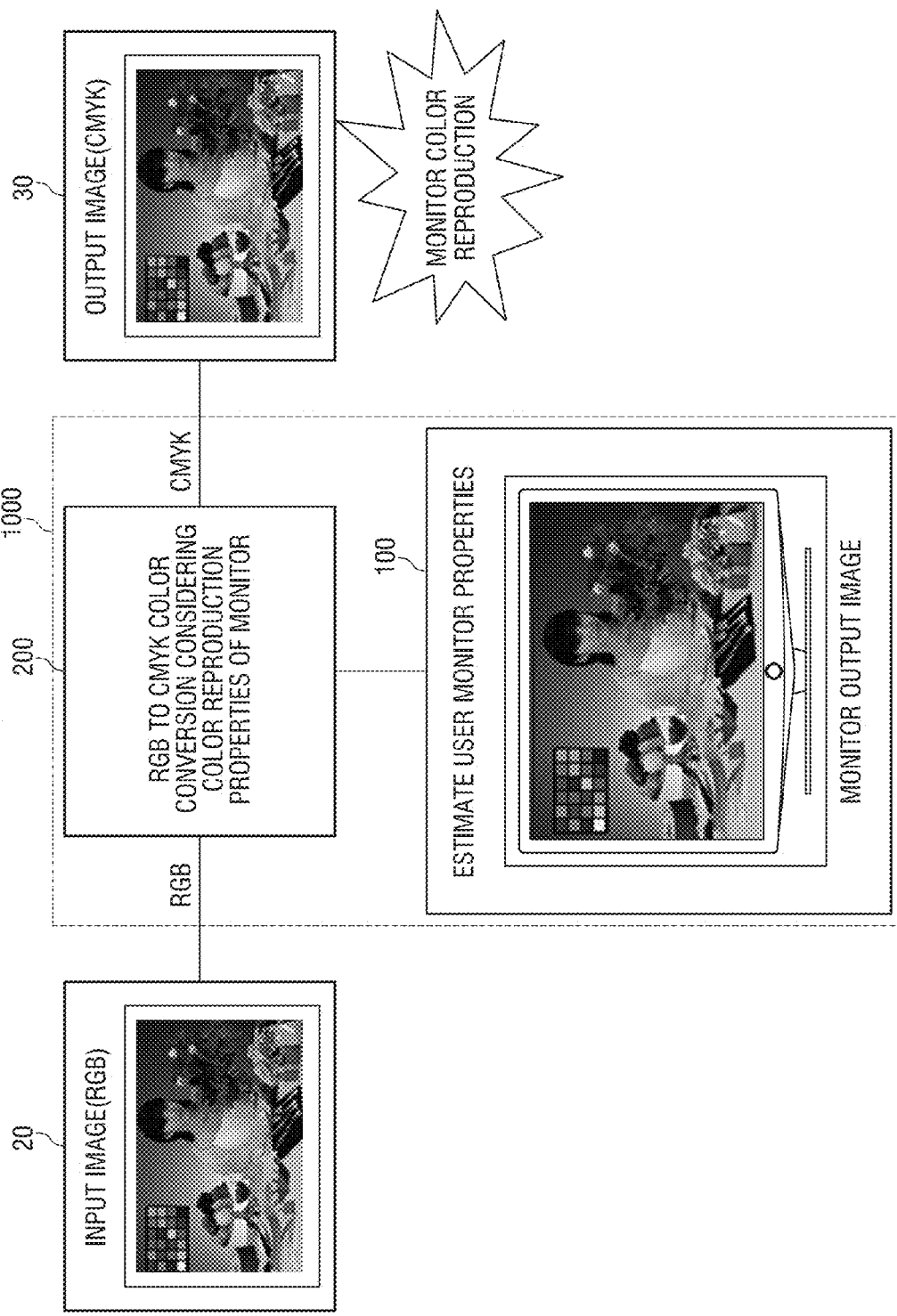
FIG. 2 is a view provided to explain a color correction method according to an exemplary embodiment.

FIG. 2 is a view provided to explain a color correction method according to an exemplary embodiment.

Referring to FIG. 2, the print controlling terminal 100, according to an exemplary embodiment, changes the properties of a user monitor and performs CMYK color conversion with regard to the input image displayed on the monitor considering the changed properties of the monitor. Therefore, the image forming apparatus may generate an output which has the colors most similar to those displayed on the monitor 10.

Figure 3:
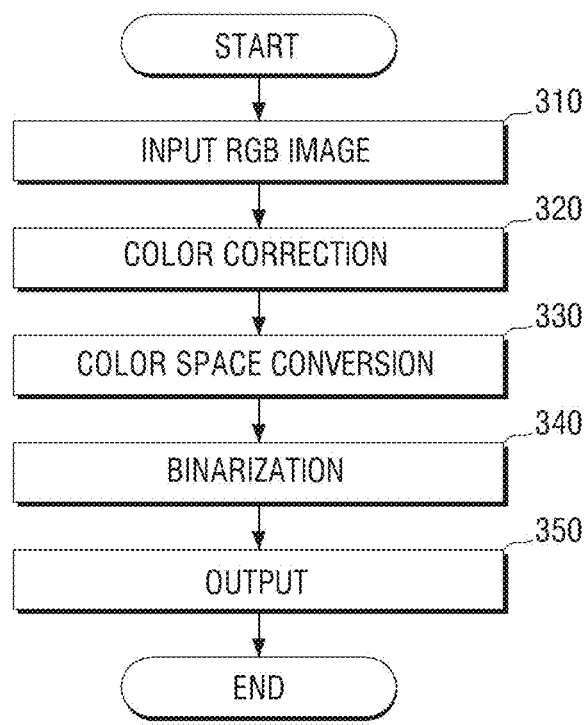
FIG. 3 is a flowchart provided to explain a color correction method according to an exemplary embodiment.

FIG. 3 is a flowchart provided to explain a color correction method according to an exemplary embodiment.

Referring to FIG. 3, an image is displayed through a monitor at operation 310. Specifically, a user may select an image to be printed from among a plurality of images displayed on the monitor. Once the user selects an image, color correction is performed on the selected image at operation 320. Specifically, color correction is performed on the selected image considering monitor output properties according to the user preferences, and thus a new RGB image may be generated. Detailed operation regarding color correction operation will be explained later with reference to FIG. 4.

Subsequently, CMYK color space conversion is performed on the changed RGB value at operation 330. Specifically, an input RGB value may be converted into a CIELAB value which is an output color of a monitor using the changed ICC profile, and the converted CIELAB value which is a monitor output color with regard to the input RGB value may be converted into a CMYK value to be used as an input to a printer using the ICC profile of the printer. Such CMYK color space conversion may be performed simply by using a color conversion table.

Binarization is applied to a value which has been converted into a CMYK color space through half-toning at operation 340. The binarized image is transmitted to the image forming apparatus 50, where it can then be printed.

Accordingly, a user may change the properties of a current monitor through the above-described processes and may generate print data having the most similar colors with the colors displayed on the monitor 10 considering the changed monitor properties. The color correction method illustrated in FIG. 3 can be performed in a print controlling terminal having the structure illustrated in FIG. 1, but the color correction method can be performed also in a print controlling terminal having other structures.

Figure 4:
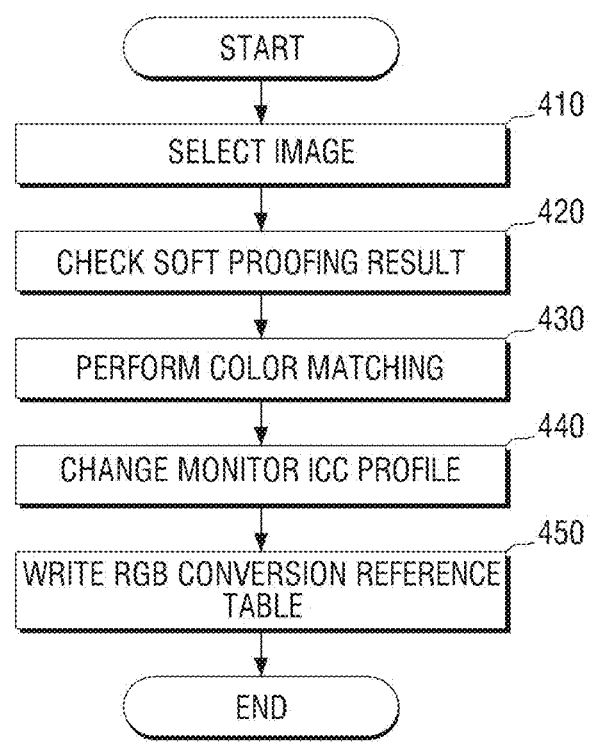
FIG. 4 is a flowchart provided to explain the color correction process in FIG. 3 in greater detail.

FIG. 4 is a flowchart provided to explain the color correction process in FIG. 3 in greater detail. First of all, a test image used in a color-matching process to change monitor output properties can be selected at operation 410. Herein, the test image is an image which is used to estimate output properties of a monitor during a color-matching process, and includes various preferred colors. Specifically, the color distribution in a test image affects estimation on the output properties, and thus a user may select an image including his or her favorite colors from among various test images.

Subsequently, soft proofing is performed on the selected test image, and the soft proofing result can be displayed at operation 420. Herein, the soft proofing represents an operation to reproduce output colors of a test image on a monitor when the test image is output by a printer. The soft proofing operation will be explained in detail with reference to FIG. 5.

Figure 5:
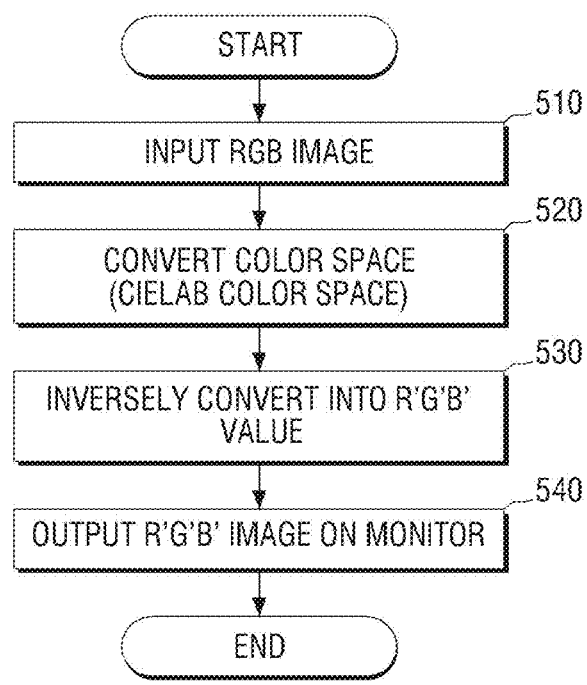
FIG. 5 is a flowchart provided to explain the soft proofing process in FIG. 4 in greater detail.

FIG. 5 is a flowchart provided to explain the soft proofing process in FIG. 4 in greater detail.

First of all, if a user selects a test image appropriate for performing color correction (operation 510), the RGB test image is converted into a CIELAB color space using the ICC profile of the printer to reproduce output colors of the printer on a monitor at operation 520.

Subsequently, the RGB image in the converted CIELAB color space is inversely converted into a new R' G' B' image using the ICC profile of the monitor at operation 530, and the inversely converted image is output on the monitor at operation 540.

Referring back to FIG. 4, if the soft proofing result is displayed, color matching can be performed at operation 430. Specifically, as output properties of a monitor are changing over time due to its element properties and since color temperature, brightness, and contrast can be adjusted by a user, colors in the soft proofing with regard to the ICC profile provided by a manufacturer may be different from the colors in the actual output image. In order to minimize such differences, color matching may be performed so that the profiles of the monitor can be adjusted with reference to the colors in the output image.

The ICC profile regarding a monitor can be changed according to the performed color matching at operation 440. The detailed operation of changing the profile regarding a monitor will be explained later with reference to FIG. 6.

A color conversion table may be generated using the changed ICC profile (operation 450). Specifically, a color conversion table may be generated using the changed ICC profile of a monitor and the ICC profile of an image forming apparatus, and the generated color conversion table may be stored.

Figure 6:
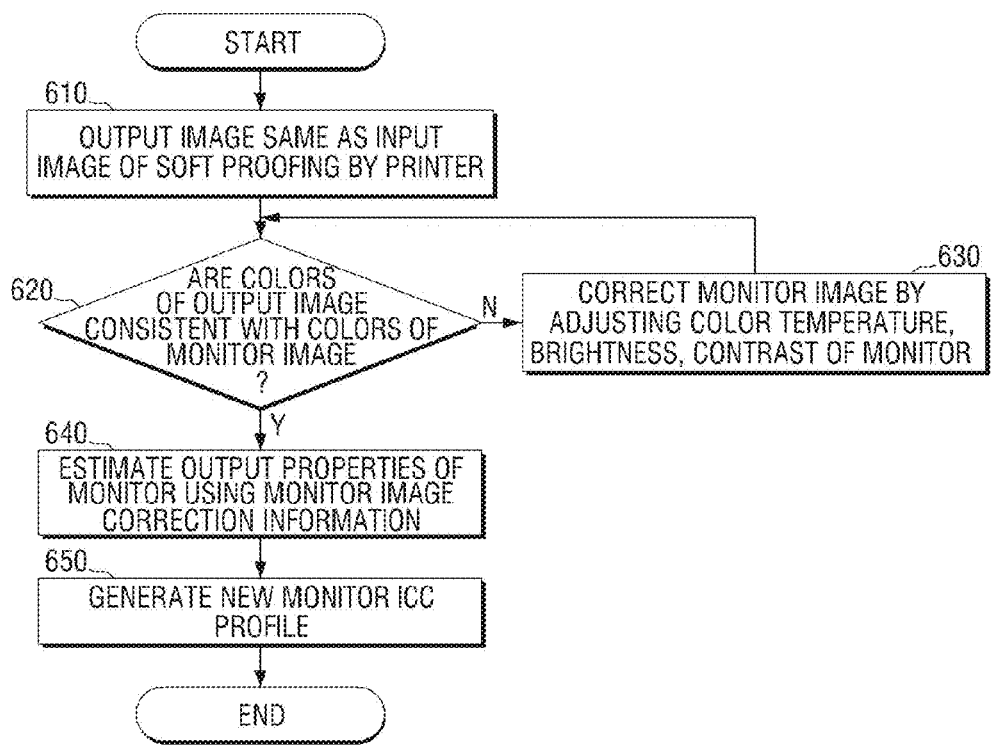
FIG. 6 is a flowchart provided to explain a process of color matching and a process of changing an ICC profile in FIG. 4 in greater detail.

FIG. 6 is a flowchart provided to explain a process of color matching and a process of changing an ICC profile in FIG. 4 in greater detail.

Referring to FIG. 6, an input image of soft proofing is output by a printer at operation 610, and the colors in the soft proofing result on the monitor are compared with the colors in the output image at operation 620.

If it is determined that the colors are not consistent, a user can correct color values of the monitor image by adjusting "color temperature," "contrast," and "brightness" of the image on the monitor (at operation 630) and compare the colors again. If the colors are consistent, output properties of the monitor are estimated using the image correction information of the monitor (at operation 640) and a new monitor ICC profile can be generated at operation 650.

In order to correct "color temperature" of the monitor, "color temperature," "contrast," and "brightness" of each RGB channel from among color information of the ICC profile should be adjusted. In general, a CIExy color space (CIE-proposed color space) value of a monitor RGB channel has the same color space as the RGB channel in an sRGB reference color space as illustrated in table 1 below.

TABLE 11

|  | sRGB | |
| --- | --- | --- |
| 채널 | x | y |
| Red | 0.640 | 0.330 |
| Green | 0.300 | 0.600 |
| Blue | 0.150 | 0.060 |
| White | 0.313 | 0.329 |

However, the color space value of white appears differently according to the type of monitor, and if a user adjusts a setting value of "color temperature" of the monitor, RGB color space does not change, but the white color space value changes. This is because white appears with an RGB channel, and the RGB ratio is changed by a brightness value instead of a color space value of the RGB channel of the monitor. In order to estimate such properties, the color space value of an RGB channel may be corrected in a CIEXYZ color space by applying the following equation.

$$\begin{bmatrix} X_R & X_G & X_B \\ Y_R & Y_G & Y_B \\ Z_R & Z_G & Z_B \end{bmatrix} \begin{bmatrix} k_R & 0 & 0 \\ 0 & k_G & 0 \\ 0 & 0 & k_B \end{bmatrix} = \begin{bmatrix} X'_R & X'_G & X'_B \\ Y'_R & Y'_G & Y'_B \\ Z'_R & Z'_G & Z'_B \end{bmatrix} \quad \text{[Equation 1]}$$

The change in the brightness of RGB is estimated by multiplying each RGB channel by a specific gain value. In this case, the gain value is performed in an area for "color temperature" correction 741 illustrated in FIG. 7.

Meanwhile, "contrast" and "brightness" properties of a monitor are related to the brightness properties of output RGB with regard to the digital RGB input signal of the monitor. The input/output properties generally perform modeling based on a Gain Offset Gamma model. That is, output brightness can be estimated by using gain, offset, and coefficient of gamma value for the input digital value of each channel as in Equation 2 below.

$$Y_i = \left( g_i \times \frac{d_i}{255} + o_i \right)^{r_i} \quad i = R, G, B \quad \text{[Equation 2]}$$

Referring to the above equation 2, 'Y' refers to output brightness, 'g' refers to gain, 'd' refers to input digital value, 'o' refers to offset, and 'r' refers to gamma.

Figure 7:
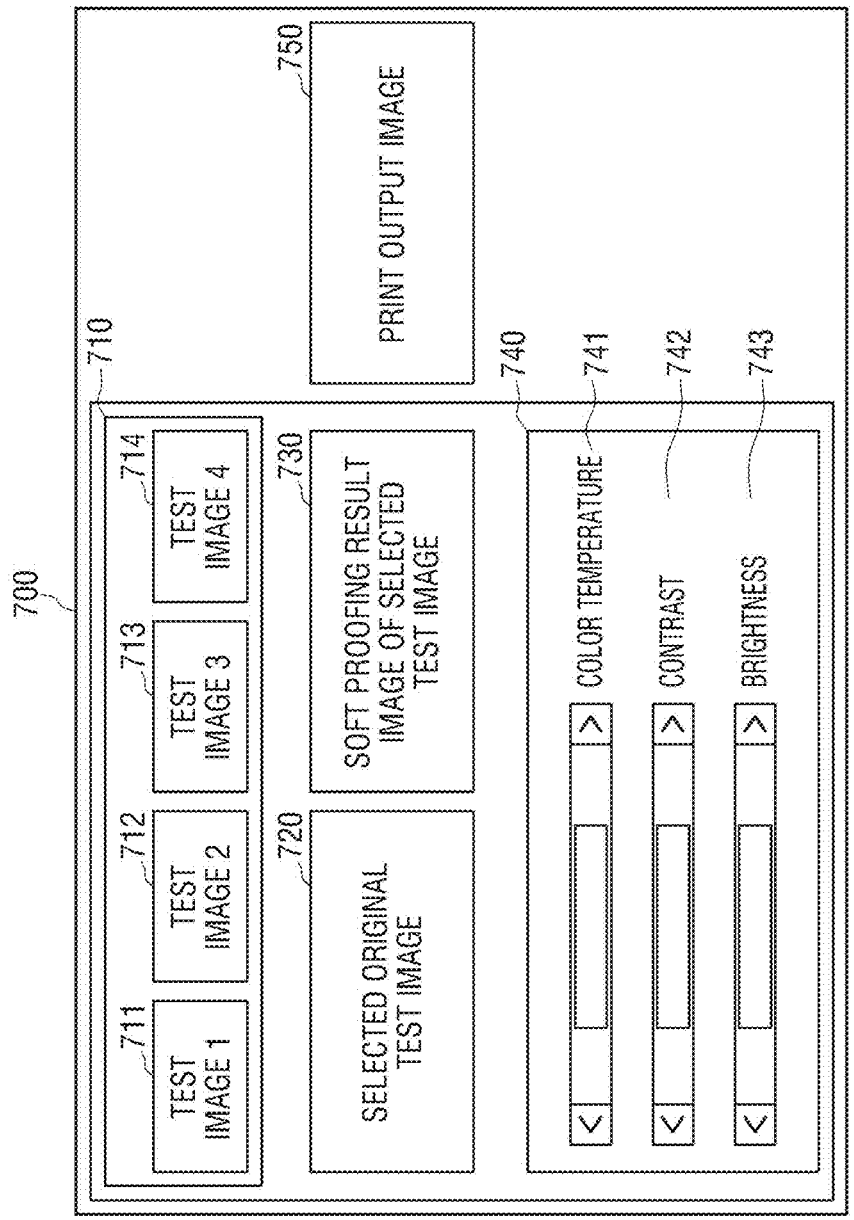
FIG. 7 is a view illustrating an example of a user interface window provided by a print controlling terminal according to an exemplary embodiment.
Figure 8:
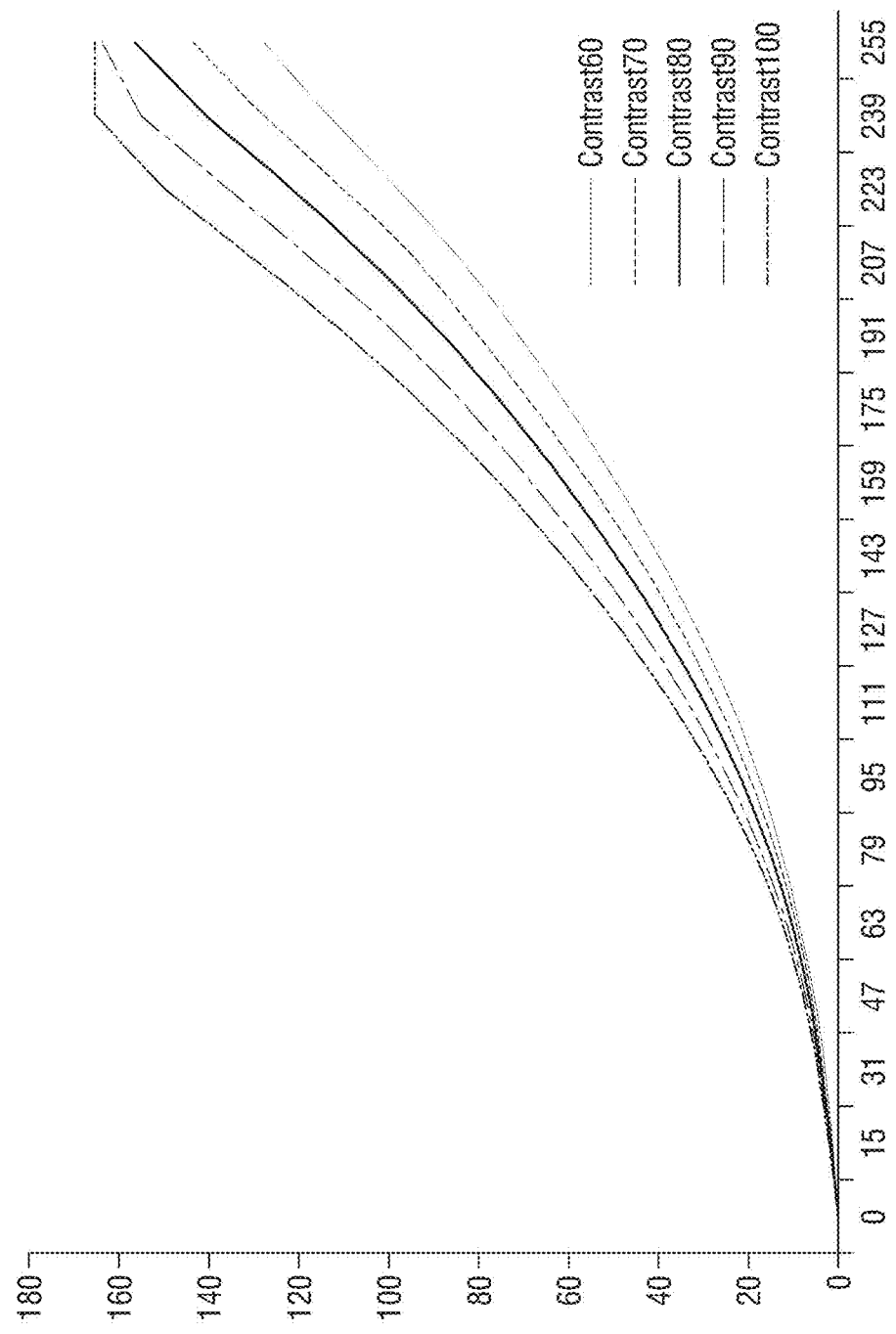
FIG. 8 illustrates an input/output properties curve which shows input/output properties as a setting value of "contrast" of a monitor changes.

If a user changes a setting value of "contrast" of a monitor, "input/output properties" of the monitor shows properties as illustrated in an input/output curve in FIG. 8. Specifically, FIG. 8 illustrates an "input/output properties" curve which shows input/output properties as a setting value of "contrast" of a monitor changes. Referring to FIG. 8, as a setting value of "contrast" of a monitor changes, the gain of the curve increases, resulting in changes in the gradient of the curve itself, and it can be seen that the gain value changes are based on the analysis using coefficients of a GOG model. Accordingly, the output properties of the monitor according to the changes in a setting value of "contrast" of the monitor can be estimated by adjusting the gain value of a GOG model. In this case, the gain value can be obtained in the area for "contrast" correction during the color matching process 742 illustrated in FIG. 7.

However, if a user changes a setting value of "brightness" of the monitor, unlike when a setting value of "contrast" of the monitor changes, the "input/output properties" curve does not change, and only an absolute "brightness" value increases. Therefore, a tone curve is not be affected by a setting value of "brightness" after it is regularized in 0~1. Accordingly, the properties of the monitor according to a setting value of "brightness" of the monitor can be estimated by using the offset value of a GOG model. In this case, the offset value can be obtained in the area for "brightness" correction 743 (see FIG. 7) during the color matching process illustrated in FIG. 6.

A new monitor ICC profile may be generated by using the estimated properties of "color temperature," "contrast," and "brightness" of the monitor after color matching.

Specifically, the RGB color space value in the existing monitor ICC profile can be corrected with the gain value of "color temperature" which is estimated in Equation 1, and "contrast" and "brightness" can be corrected by converting the tone curve reference table of the ICC profile based on Equation 2.

FIG. 7 is a view illustrating an example of a user interface window provided by a print controlling terminal according to an exemplary embodiment.

Referring to FIG. 7, the user interface window 700 comprises a first area 730 which shows the result of soft proofing on an image selected by a user, a second area 740 in which output properties of a monitor can be adjusted to perform color matching, a third area 710 in which a plurality of test images can be displayed, a fourth area 720 in which an image selected by the user is displayed, and a fifth area 750 in which an actual print area is displayed.

Specifically, the third area 710 is an area to display a plurality of test images including each preferred color to reflect a user's intention for color conversion.

The fourth area 720 is an area to display an original image of the selected test image from among the test images in the third area 710, and the first area 730 is an area to display the result of soft proofing on the test image selected by the user.

Accordingly, the user may compare the output image 750 of an original test image selected for color matching, which is output by a printer, with the soft proofing image 730, and perform color matching by adjusting correction information regarding "color temperature" 741, "contrast" 742, and "brightness" 743, which are related to the output properties of a monitor so that the colors of the two images displayed in the second area 740 can be consistent with each other.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A color correction method in a print controlling terminal which is connectable to an image forming apparatus, the method, comprising:
    displaying an expected print image of a test image of the image forming apparatus on a monitor;
    outputting the test image to the image forming apparatus;
    performing color matching between the output test image and the expected print image on the monitor;
    changing an ICC profile of the monitor according to the performed color matching; and
    generating a print data using the changed ICC profile.

2. The method as claimed in claim 1, wherein the performing color matching comprises performing color matching by adjusting at least one of color temperature, brightness, and contrast of the expected print image.

3. The method as claimed in claim 1, wherein the displaying the expected print image comprises converting the test image into an image in a CIELAB color space using an ICC profile of the image forming apparatus, inversely converting the test image which is converted into the image in a CIELAB color space into a new image of RGB color space using a pre-stored ICC profile of the monitor, and displaying the inversely converted test image as an expected output image.

4. The method as claimed in claim 1, wherein the changing the ICC profile comprises estimating at least one of color temperature, brightness, and contrast of the monitor and changing an ICC profile of the monitor using the estimated properties.

5. The method as claimed in claim 4, wherein the changing the ICC profile comprises changing an ICC profile of the monitor by correcting a color space value of a pre-stored ICC profile of the monitor using the estimated color temperature.

6. The method as claimed in claim 4, wherein the changing the ICC profile comprises correcting contrast and brightness of the pre-stored ICC profile using a following equation:

$$Y_i = \left(g_i \times \frac{d_i}{255} + o_i\right)^{r_i} \ i = R, G, B$$

wherein 'Y' refers to output brightness, 'g' refers to gain, 'd' refers to input digital value, 'o' refers to offset, and 'r' refers to gamma.

7. The method as claimed in claim 1, wherein the test image includes a user's favorite color.

8. The method as claimed in claim 1, wherein the generating the print data comprises generating a color conversion table using a changed ICC profile of the monitor and an ICC profile of the image forming apparatus and generating print data using the generated color conversion table.

9. The method as claimed in claim 8, further comprising: storing the generated color conversion table.

10. A print controlling terminal which is connectable to an image forming apparatus, the terminal comprising:
    a video driver unit to display an expected print image of a test image of the image forming apparatus on a monitor;
    a communication interface unit to output the test image to the image forming apparatus;
    an input unit to perform color matching between the output test image and an expected print image on the monitor;
    a changing unit to change an ICC profile of the monitor according to the performed color matching; and
    a driver unit to generate a print data using the changed ICC profile.

11. The print controlling terminal as claimed in claim 10, wherein the input unit performs color matching by adjusting at least one of color temperature, brightness, and contrast of the expected print image.

12. The print controlling terminal as claimed in claim 10, wherein the video driver unit converts the test image into an image in a CIELAB color space using an ICC profile of the image forming apparatus, inversely converts the test image which is converted into the image in a CIELAB color space into a new image of RGB color space using a pre-stored ICC profile of the monitor, and displays the inversely converted test image as an expected output image.

13. The print controlling terminal as claimed in claim 10, wherein the changing unit estimates at least one of color temperature, brightness, and contrast of the monitor and changes an ICC profile of the monitor using the estimated properties.

14. The print controlling terminal as claimed in claim 13, wherein the changing unit changes an ICC profile of the monitor by correcting a color space value of a pre-stored ICC profile of the monitor using the estimated color temperature.

15. The print controlling terminal as claimed in claim 13, wherein the changing unit corrects contrast and brightness of the pre-stored ICC profile using a following equation:

$$Y_i = \left(g_i \times \frac{d_i}{255} + o_i\right)^{r_i} \quad i = R, G, B$$

wherein 'Y' refers to output brightness, 'g' refers to gain, 'd' refers to input digital value, 'o' refers to offset, and 'r' refers to gamma.

16. The print controlling terminal as claimed in claim 10, wherein the test image includes a user's favorite color.

17. The print controlling terminal as claimed in claim 10, wherein the driver unit generates a color conversion table using a changed ICC profile of the monitor and an ICC profile of the image forming apparatus and generates print data using the generated color conversion table.

18. The print controlling terminal as claimed in claim 17, further comprising:
a storage unit which stores the generated color conversion table.

19. A print controlling terminal which is connectable to an image forming apparatus, the terminal comprising:
a video driver unit to display a user interface window comprising a first area where an expected print image of a test image of the image forming apparatus is displayed and a second area where at least one of color temperature, brightness and contrast of a monitor is input based on the displayed expected print image and an output test image of the image forming apparatus for color matching;
a changing unit to change an ICC profile of the monitor according to the performed color matching; and
a driver unit to generate print data using the changed ICC profile.

20. The print controlling terminal as claimed in claim 19, wherein the user interface window further comprises a third area where a plurality of test images are displayed and a fourth area where a test image output on the image forming apparatus from among the plurality of test images is displayed.

21. A color correction method in a print controlling terminal which is connectable to an image forming apparatus, the method, comprising:
comparing an output result of a test image by the image forming apparatus to a displayed expected print image on a monitor;
changing an ICC profile of the monitor based on the comparison; and
generating a print data using the changed ICC profile.

22. The method as claimed in claim 21, wherein the changing of the ICC profile includes estimating the color temperature, brightness and contrast properties of the monitor, and then changing the ICC profile of the monitor using the estimated properties.

23. The method as claimed in claim 22, wherein the generating the print data includes generating a color conversion table using the changed ICC profile of the monitor and the ICC profile of the image forming apparatus and using the generated color conversion table.

24. A print controlling terminal which performs color correction of an image, the terminal comprising:
a controller to control displaying an expected print image of a test image of the image forming apparatus on a monitor, to control outputting the test image to the image forming apparatus, and to perform color matching between the output test image and an expected print image on the monitor;
a changing unit to change an ICC profile of the monitor according to the performed color matching; and
a driver unit to generate a print data using the changed ICC profile.

25. The terminal as claimed in claim 24, further including an input unit to receive a user input which is provided to the controller to perform the color matching.

* * * * *